United States Patent
Han et al.

(10) Patent No.: US 8,189,295 B2
(45) Date of Patent: May 29, 2012

(54) PERPENDICULAR MAGNETIC RECORDING HEAD WITH A BOTTOM SIDE SHIELD

(75) Inventors: Cherng-Chyi Han, San Jose, CA (US); Min Li, Dublin, CA (US); Fenglin Liu, Milpitas, CA (US); Lijie Guan, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/135,276

(22) Filed: Jun. 30, 2011

(65) Prior Publication Data

US 2011/0261486 A1 Oct. 27, 2011

Related U.S. Application Data

(62) Division of application No. 11/809,346, filed on May 31, 2007, now Pat. No. 7,978,431.

(51) Int. Cl.
 *G11B 5/127* (2006.01)
(52) U.S. Cl. .................................................. 360/125.3
(58) Field of Classification Search ................ 360/125.3
See application file for complete search history.

(56) References Cited

U.S. PATENT DOCUMENTS

| | | | |
|---|---|---|---|
| 6,741,433 B1 | 5/2004 | Nishioka | |
| 6,754,054 B2 | 6/2004 | Seigler et al. | |
| 6,912,769 B2 | 7/2005 | Yoda et al. | |
| 6,943,993 B2 | 9/2005 | Chang et al. | |
| 6,967,823 B2 | 11/2005 | Nakamoto et al. | |
| 7,002,775 B2 | 2/2006 | Hsu et al. | |
| 7,392,577 B2 | 7/2008 | Yazawa et al. | |
| 7,535,675 B2 | 5/2009 | Kimura et al. | |
| 7,898,773 B2 | 3/2011 | Han et al. | |
| 2002/0071208 A1 | 6/2002 | Batra et al. | |
| 2004/0218309 A1 | 11/2004 | Seigler | |

*Primary Examiner* — David D Davis
(74) *Attorney, Agent, or Firm* — Saile Ackerman LLC; Stephen B. Ackerman

(57) ABSTRACT

A perpendicular magnetic recording (PMR) head has a pole tip shielded laterally by a separated pair of bottom side shields and shielded from above by an upper shield. The bottom side shields surround a lower portion of the pole tip while the upper portion of the pole tip is surrounded by non-magnetic layers. The bottom shields and the non-magnetic layer form a wedge-shaped trench in which the pole tip has been formed by a self-aligned plating process. A write gap layer and an upper shield is formed above the side shields and pole. The resulting structure substantially eliminates track overwrite while maintaining good track definition.

8 Claims, 5 Drawing Sheets

PERPENDICULAR MAGNETIC RECORDING HEAD WITH A BOTTOM SIDE SHIELD

This is a Divisional Application of U.S. patent application Ser. No. 11/809,346, filed on May 31, 2007, now U.S. Pat. No. 7,978,431, which is herein incorporated by reference in its entirety, and assigned to a common assignee.

RELATED PATENT APPLICATIONS

This Application is Related to U.S. Ser. No. 11/345,892, Filing Date, Feb. 2, 2006, now issued on Mar. 1, 2011 as U.S. Pat. No. 7,898,773, Assigned to the Same Assignee as the Present Application.

BACKGROUND OF THE INVENTION

1. Field of the Invention

This invention relates generally to magnetic recording heads, particularly to perpendicular recording heads that produce their recording magnetic fields perpendicularly to the recording medium 2. Description of the Related Art The increasing need for high recording area densities (up to 500 Gb/in$^2$) is making the perpendicular magnetic recording head (PMR head) a replacement of choice for the longitudinal magnetic recording head (LMR head).

By means of fringing magnetic fields that extend between two emerging pole pieces, longitudinal recording heads form small magnetic domains within the surface plane of the magnetic medium (hard disk). As recorded area densities increase, these domains must correspondingly decrease in size, eventually permitting destabilizing thermal effects to become stronger than the magnetic interactions that tend to stabilize the domain formations. This occurrence is the so-called superparamagnetic limit. Recording media that accept perpendicular magnetic recording, allow, domain structures to be formed within a magnetic layer, perpendicular to the disk surface, while a soft magnetic underlayer (SUL) formed beneath the magnetic layer acts as a stabilizing influence on these perpendicular domain structures. Thus, a magnetic recording head that produces a field capable of forming domains perpendicular to a disk surface, when used in conjunction with such perpendicular recording media, is able to produce a stable recording with a much higher area density than is possible using standard longitudinal recording. In this regard, Yoda et al. (U.S. Pat. No. 6,912,769) teaches a thin film magnetic head for perpendicular recording in which the main magnetic pole tip protrudes through an aperture formed within a thin film.

A significant problem with magnetic pole structures that are currently used to produce perpendicular fields, is that the fields tend to exhibit significant lateral fringing, thereby producing unwanted side-writing (writing in adjacent tracks). This problem is much more evident in the perpendicular writing head than in the longitudinal writing head, even when the perpendicular head is shielded laterally to contain the fringing fields.

Among the efforts in the prior art to address the adverse effects of field fringing is the shielded head of Hsu et al. (US Patent Application Publication US2005/0068678) that uses side shields connected to a trailing shield by ferromagnetic studs. By locating the studs behind the ABS of the head, the return flux flow does not impinge on the disk itself. Yazawa et al. (US Patent Application Publication US 2005/0057852) teaches a perpendicular magnetic writing pole that includes a shield layer conformally formed over the pole. Thus, there is a single piece shield that covers top and side surfaces of the pole. Such integral formation allows the formation of a large shield which, it is suggested, is better able to absorb the return flux of the recording head. Batra et al. (US Patent Application Publication US 2002/0071208) teaches a perpendicular magnetic recording head in which the write pole is structured so that its return pole is itself formed surrounding the main pole. Thus it is the pole shape that eliminates a large degree of undesirable field fringing. The pole can, in addition, be surrounded by side shields to further reduce the effects of fringing. Kimura et al. (US Patent Application Publication US 2005/0162778) describes a method of forming the track restriction region of the main pole of a perpendicular recording head using an ion milling process. There is no particular mention of the formation of shields around the pole.

The present inventors, in related application Ser. No. 11/345,892, fully incorporated herein by reference, provided a method of forming a three-way side shielded head (top and side shields) that significantly reduced side fringing and, as a result, allowed the formation of a larger pole, while providing the same degree of track resolution and protection from side overwriting. As an aspect of that invention, the side shields themselves are used to form the pole tip, using a trench formed within the side shields to provide a self-aligned method of shaping the pole tip in an advantageous manner. More recently, further study of the shielded head design cited above indicated that it was possible to improve on the performance of that design, particularly with respect to further reduction of field fringing and an improvement in the tightness and definition of the field flux at the recording surface. Reduction of field fringing is of great importance in eliminating the problem of overwriting, in which writing on one track affects what has already been written on adjacent tracks. Essentially, the reasons for the improvement can be stated as follows. If the pole tip of the writer was completely unshielded, there would be a high flux at the surface of the medium, but the spreading of the flux would produce poor resolution and adjacent track overwrite. In the design of Ser. No. 11/345,892, the shield substantially covered the entire sides of the pole tip, thereby producing good overwrite performance, but low flux. It will be the object of the present invention to strike the middle ground, whereby the vertical extension of the shields will be less than that of Ser. No. 11/345,892, thereby providing a gain in spatial resolution, while not sacrificing the flux strength at the recording medium.

SUMMARY OF THE INVENTION

A first object of this invention is to provide a method of forming a shielded pole structure for a perpendicular magnetic recording (PMR) head capable of recording at high area densities (up to 500 Gb/in$^2$).

A second object of the present invention is to provide a method of forming such a shielded pole structure for a perpendicular magnetic recording head in which side fringing of the magnetic field is significantly reduced, while the recording flux is strong and has a high degree of definition.

A third object of the present invention is to provide a method of forming such a shielded pole structure in which overwriting of adjacent tracks is eliminated or significantly reduced and in which individual tracks have a well defined profile.

A fourth object of the present invention is to provide a method of forming a perpendicular magnetic write head in which the magnetic pole is shielded from above and from its sides.

A fifth object of the present invention is to provide a method of forming a perpendicular magnetic write head in which the effectiveness of the shielding allows the formation of a larger physical pole.

A sixth object of the present invention is to provide a method of forming a perpendicular magnetic write head in which the pole tip is "self-aligned," i.e. it is formed using the shape of the side shields to provide alignment.

A seventh object of the present invention is to provide the shielded pole structure for the perpendicular magnetic recording head that is formed by the method.

The objects of the present invention are realized by the formation of a self-aligned, three-way shielded PMR pole structure to be used within a PMR head wherein a pair of bottom side shields (shields formed surrounding the bottom portion of a magnetic pole tip) are formed using reactive ion etching (RIE) or ion beam etching (IBE) together with a combination of gases selected to achieve high etch selectivity between a metal mask formed of, for example, tantalum (Ta) ruthenium (Ru), nickel chromium alloy (NiCr) or titanium (Ti), a layer of non-magnetic, insulating material such as alumina, and magnetic shield material formed of nickel-iron (NiFe) alloy. The selectively etched RIE (or IBE) process allows the dimensions of the mask opening to remain well defined while a beveled trench is formed within a double layer comprising an upper layer of the aforesaid non-magnetic material formed on a lower layer of the shield material, thereby separating the shield layer into two separate bottom side shields whose sidewalls are the lower portion of the walls of the trench. A magnetic pole is then formed, by plating a layer of magnetic material within the trench, the bevel angle of the magnetic pole being determined (ie., self-aligned) by the sidewall profile of the non-magnetic layer and the magnetic shield layer. An upper shield is thereafter formed over a write-gap layer covering the pole and the non-magnetic layer, creating the final three-way shielded structure of the present invention. The invention does not describe the formation of other elements of the write head, such as energizing coils, since these are well known in the prior art. Nevertheless, the shielded pole structure operates advantageously with such energizing coils.

DESCRIPTION OF THE PREFERRED EMBODIMENTS

The preferred embodiment of the present invention is a shielded pole structure for use within a perpendicular magnetic recording (PMR) head, in which the pole tip is formed and shaped within a trench formed between a pair non-magnetic layers and a pair of bottom side shields and is thereafter covered from above by a write-gap layer and an upper shield. This three-way shield formation (two bottom side shields, one upper shield) effectively eliminates side writing by the pole while maintaining flux strength and flux definition and, thereby, allows the formation of a physically larger pole while still maintaining desired track width definition.

Figure 1:
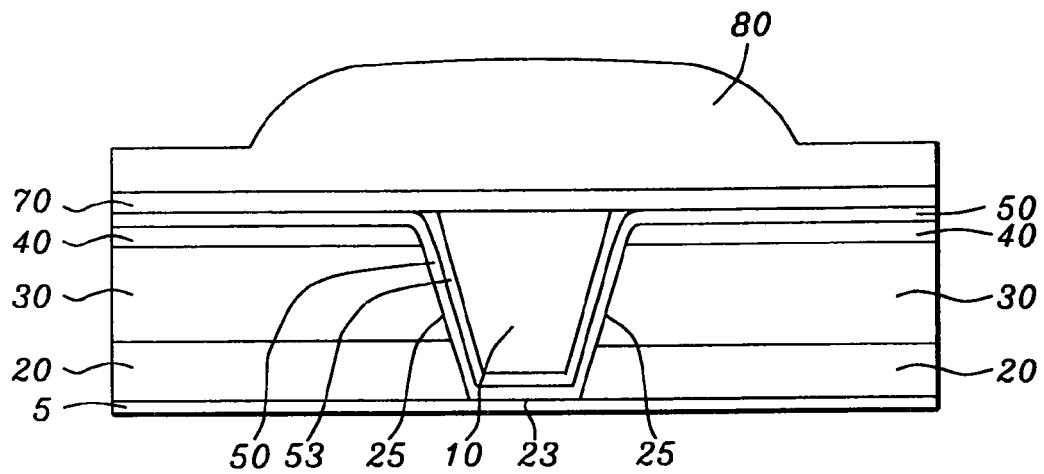
FIG. 1 is a schematic representation of an air bearing surface (ABS) surface cross-sectional view of the completed shielded PMR pole structure of the present invention.
Figure 2:
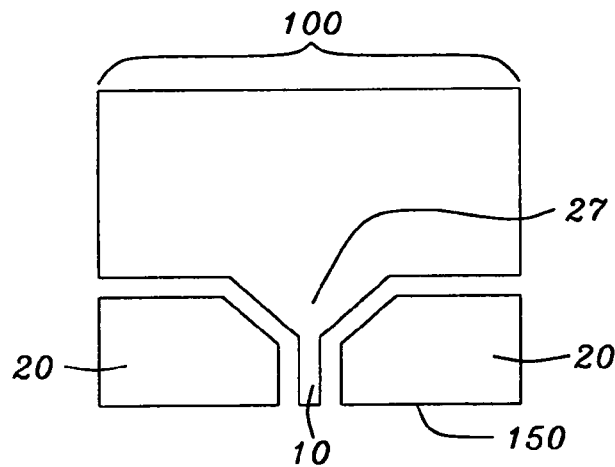
FIG. 2 is a schematic representation of an overhead view, through an intermediate level horizontal cross-sectional plane, of the pole structure in FIG. 1.

Two views, front and overhead, of the completed pole fabrication can be seen by referring to FIGS. 1 and 2. FIG. 1 is a schematic view facing the ABS plane of the shielded PMR pole structure as it appears when formed as part of the PMR head (nominally called the "front" of the head). This view shows, in a vertical cross-section, a substrate (5), the beveled pole tip (10) shaped by being formed in a beveled trench that extends perpendicularly to the ABS plane, two opposing bottom side shields (20) laterally symmetrically disposed about the lower portion of the pole tip, two layers of non-magnetic material (alumina in this embodiment) (30) formed over the side shields and laterally disposed about an upper portion of the pole tip. The facing co-planar, slanted lateral sides (25) of the two bottom shields and the two layers of non-magnetic material (30), together form the sidewalls of the trench, while the exposed upper surface of the substrate (23) forms the bottom of the trench. As can be seen, the facing surfaces (25) of the two side shields and the non-magnetic layer above them are slanted in such a way as to form a truncated wedge-shaped opening, widest at the opening into the upper layer of non-magnetic material, within which is formed the beveled pole tip. The remnants of a metal etch mask (40) are also shown. A side-gap layer of alumina (50) deposited by atomic layer deposition (ALD) is shown conformally covering the upper surface of the etch mask (40) and the sidewalls (25) of the trench. The remnant of a chemical-mechanical polishing (CMP) stopping layer (53) that is used to define the upper surface of the pole tip by polishing is shown lining the bottom and sidewalls of the trench. A plating seed layer (not visible because it has been incorporated into the plated pole) on which the self-aligned pole piece tip is plated is between the surface of the stopping layer (53) and the pole tip (10). As noted above, the plated magnetic pole tip (10), shown in its ABS cross-section, fills the lined trench layer. A horizontal write-gap layer (70), also formed of ALD alumina, is formed over the ALD side-gap alumina layer (50) and exposed upper pole tip surface and an upper shield (80) is formed over the pole tip on a seed layer (not shown) deposited on the surface of the write-gap layer (70) and indicated only as its surface. The rear portion of the pole tip is not seen in this figure, but is seen (as (27)) in the overhead view of FIG. 2. The rear portion and the tip are continuous and form the complete lower pole piece ((100) in FIG. 2). It is understood that the shielded pole structure that is the subject of the present invention will be formed as part of a complete write head that includes, for example, a coil structure to energize the pole.

Referring now to FIG. 2, there is shown an overhead cross-sectional view, through a low horizontal plane, of the fabrication of FIG. 1. Because of the position of the plane, the upper shield is not shown. Two separated bottom side shields (20) are seen laterally disposed about the pole tip (10). The length of the pole tip is between approximately 0.05 and 0.15 microns and it extends transversely (i.e., perpendicularly to the ABS plane (150) defining the front of the shields and from front to rear of the shields), substantially the entire length of the separation between the side shields. The width of the pole tip at the ABS is between approximately 100 to 180 nanometers and the pole tip flares out behind the side shields to form a rear portion (27) of the pole piece. A spirally wound conducting coil (not shown in this figure) is formed around a rear portion of the pole, as is well known in the art. When energized by a current, the coil will produce a substantially perpendicular magnetic field emerging from the pole tip and shielded from undesirable lateral side fringing by the bottom side shields.

Figure 3:
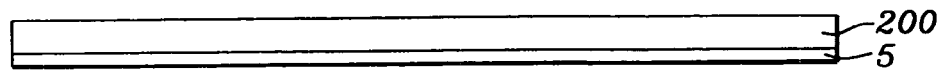
FIG. 3, FIG. 4, FIG. 5, FIG. 6, FIG. 7, FIG. 8, FIG. 9, FIG. 10A, FIG. 10B, FIG. 11 and FIG. 12 are schematic views of the successive process steps required to complete the fabrication shown in FIGS. 1 and 2.

Referring now to FIG. 3, there is shown, schematically, the first step in a preferred process embodiment that will form the completed fabrication of FIGS. 1 and 2. In this step, a layer of shield material (200) is preferably plated on an alumina substrate (5), which would include a seed layer (not shown) for the purpose of the plating process. The shield material is a layer of magnetic material such as NiFe (or $Fe_{85}Ni_{15}$) and it is plated to a thickness between approximately 500 and 2000 angstroms.

Figure 4:
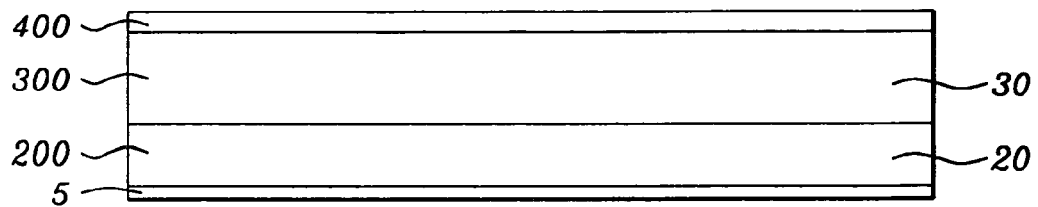

Referring now to FIG. 4, there is shown schematically the deposition of a layer (300) of non-magnetic material, such as alumina or silicon dioxide, on the shield layer. The alumina is deposited, preferably by a method such as plasma vapor deposition (PVD) to a thickness between approximately 1000 and 3500 angstroms. Referring still to FIG. 4, there is shown a metal mask layer (400), such as a layer of Ta, Ru, NiCr, or Ti, that has been formed to a thickness between approximately 800 and 1000 angstroms on the upper surface of the alumina layer (300). The mask layer should have high etch selectivity in comparison to the shield layer, that is, it should etch more slowly than the shield material, both when using an IBE for patterning an opening in the mask and when using RIE to etch away the shield material exposed by the opening. This selectivity will allow the dimensions of the mask opening to remain well defined during the etch process. The mask layer will also be used as a CMP stopping layer at a subsequent step in the process.

Figure 5:
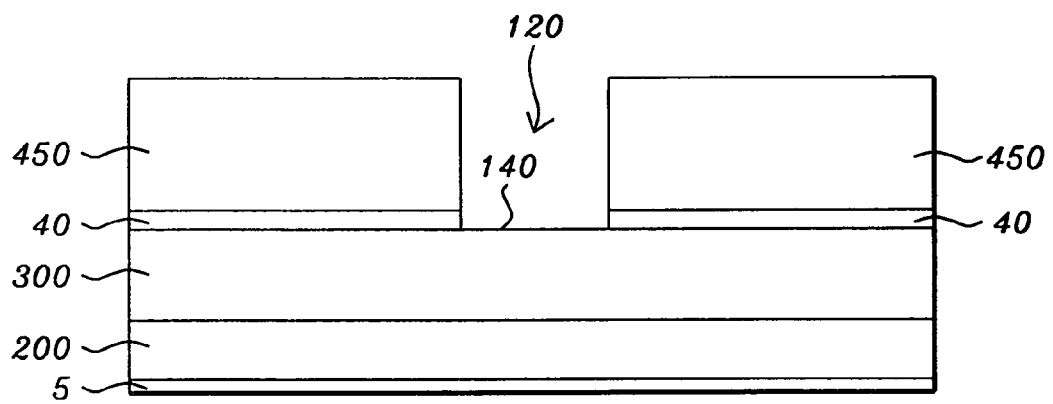

Referring next to FIG. 5, there is shown, schematically, a patterned layer of photoresistive material (450) formed over the mask layer (40). An IBE has already been applied through the opening (120) in the photoresistive material to create a corresponding opening in the mask layer and to expose a surface portion (140) of the non-magnetic layer (300). The opening is directed transversely to the ABS of the PMR head being fabricated. The original mask layer ((400) in FIG. 4) is now separated into two laterally disposed segments (40).

Figure 6:
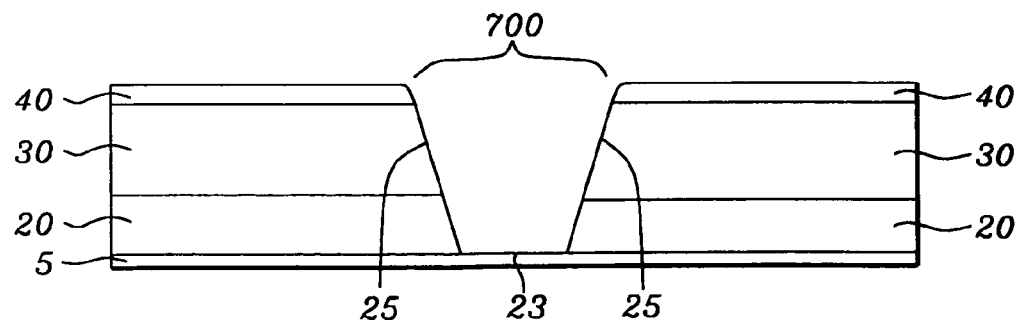

Referring next to FIG. 6, there is shown, schematically, the fabrication of FIG. 5 subsequent to an etching process applied through the opening between the mask layer (40) that etches through both the alumina layer, now separated into two layers (30) and penetrating through the shield layer (20). The etching process exposes a surface region (23) of the substrate (5). The etching process can be the application of a RIE using two chemistries, one to etch completely through the alumina layer, the other to etch completely through the shield layer. An appropriate RIE etch chemistry for the alumina layer is $Cl_2/BCl_3/CF_4$. An appropriate RIE etch chemistry for the NiFe shield layer is $CH_3OH/CO/NH_3$. Alternatively to the use of two RIE processes, the two layers can be etched by the application of an RIE to the alumina layer, followed by an ion-beam etch (IBE) through the shield layer. The IBE appropriate to the shield layer is an $Ar^+$ ion beam at 650 V and 1200 mA.

The RIE gases indicated above will be highly etch selective between the mask material, the alumina and the shield material, etching away the mask material at a slower rate than the alumina and shield material to maintain dimensional control. As a result of this selectivity, the opening in the mask layer remains well defined and allows the gas to form a trench (700) within the alumina layer and the shield layer, extending downward substantially to the substrate (5), with sloping sidewalls (25) and a separation between the walls that is greater at the mask (40) opening than at the trench bottom (the substrate), of between approximately 300 and 350 nanometers. In a preferred embodiment the combination of the gases $CO/NH_3$ at a pressure of 0.8 Pa and supplied at a rate of 15 sccm is used, with power to the substrate supplied at a rate of 1000 W and bias power being supplied at 1200 W. These etch parameters will produce an etch rate in the mask layer of approximately 2 nm/min and in the shield layer of approximately 34 nm/min. Thus, the bottom shield layer, as a result of the etched trench, is formed into two separated, facing shield layers, between approximately 0.3 and 0.35 microns apart, the facing sides having a sloping shape produced by the RIE etch. This sloping shape is important for aligning the magnetic pole tip and shaping it appropriately.

Figure 7:
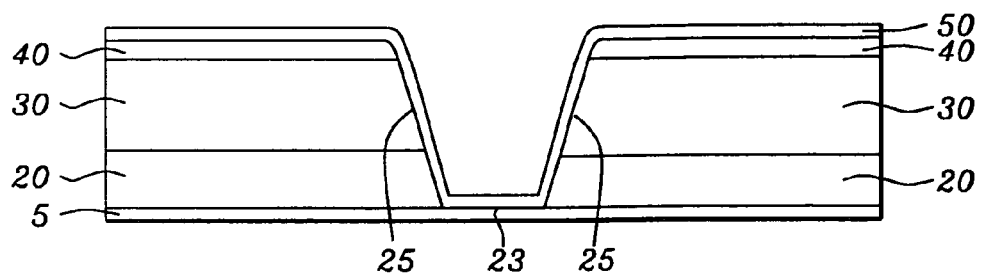

Referring next to FIG. 7, there is shown, schematically, the fabrication of FIG. 6 subsequent to the deposition of a layer of alumina (50) on the mask layer (40), the alumina thereby also conformally covering the exposed trench surfaces (25) within the shield layer and the exposed substrate surface (23). The alumina layer is formed to a thickness between approximately 300 and 500 angstroms by a process of atomic layer deposition (ALD) or PVD and it will form a uniform side gap layer on either side of the pole tip that is about to be formed. This alumina layer is deposited to a thickness between approximately 500 and 1500 angstroms by the ALD process.

Figure 8:
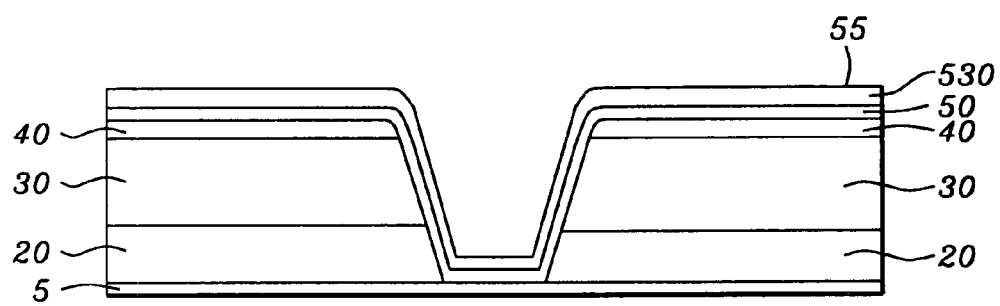

Referring next to FIG. 8, there is shown, schematically, the fabrication of FIG. 7 subsequent to the deposition onto the surfaces of the alumina side gap layer (50) of a chemical-mechanical polishing (CMP) stopping layer (530). A seed layer (55) of Ta, Ru, or CoNiFe, formed to a thickness between approximately 500 and 1000 angstroms and suitable for the plating of a magnetic pole thereon is formed on the surface of the stopping layer and, for simplicity, is indicated in the figure as the surface of the stopping layer. The CMP stopping layer (530) will allow extra plated pole tip material, described below in FIG. 9, to be removed without damage to the fabrication.

Figure 9:
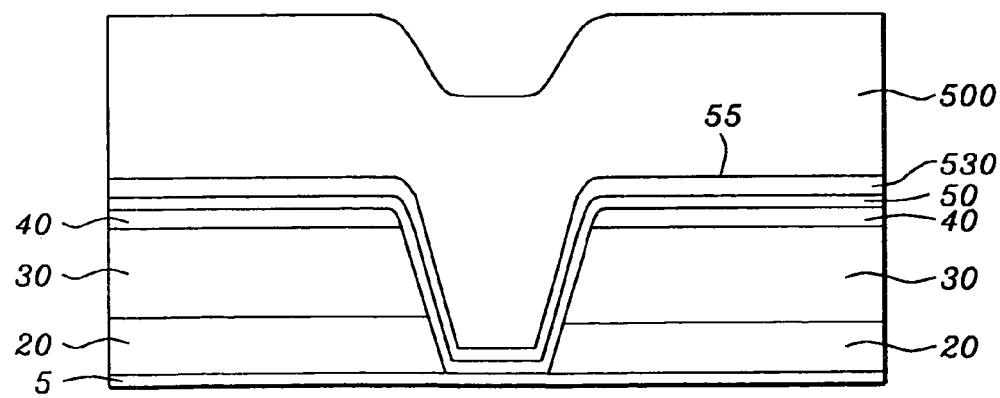

Referring now to FIG. 9, there is shown schematically the fabrication of FIG. 8 wherein a magnetic pole layer (500) has been plated onto the seed layer (55) covering the surface of the stopping layer (530). The magnetic pole layer is preferably a layer of low coercivity magnetic material such as NiFe or FeNi and it is plated to a thickness sufficient to at least conformally fill the trench in a void-free manner.

Figure 10A:
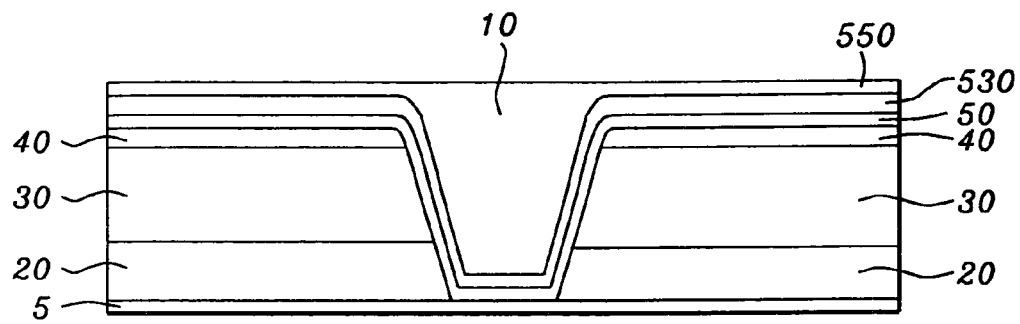
Figure 10B:
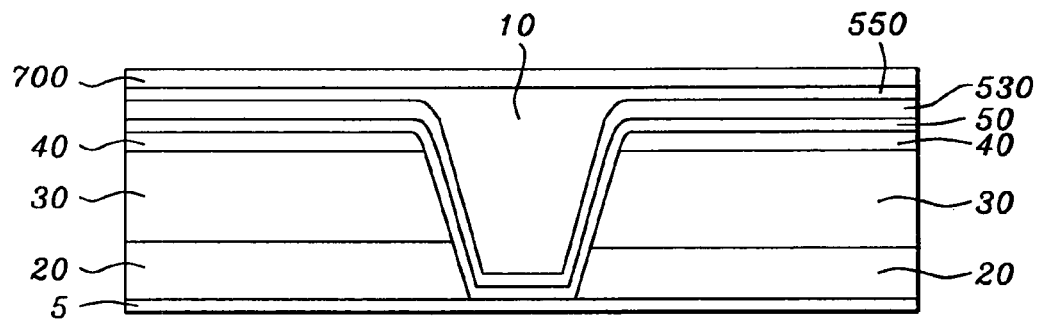
Figure 11:
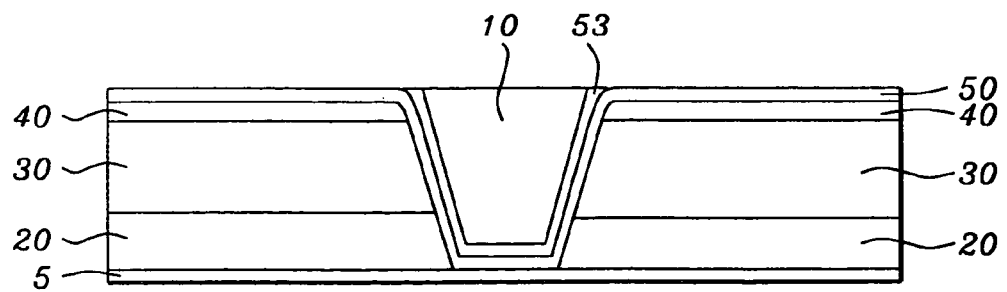
Figure 12:
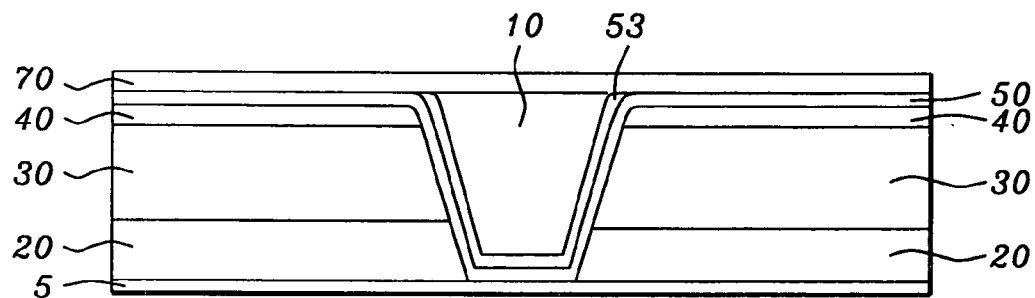
Figure 13:
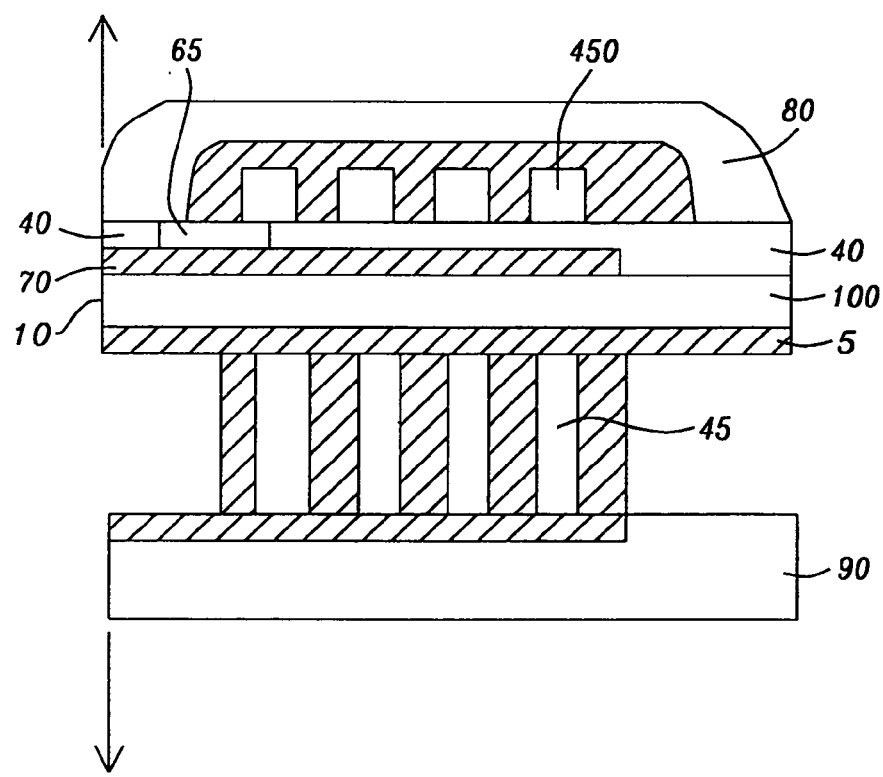
FIG. 13 is a schematic figure showing an exemplary write head incorporating the shielded pole of the present invention.

Referring next to FIGS. 10A and 10B, there is shown a process by which the excess plated pole material ((500) in FIG. 9) is removed and the planar surface of FIG. 11 is achieved.

The removal of the excess pole material is accomplished by the following sequence of three steps, step (1) being illustrated schematically in FIG. 10A:

(1) a preliminary wet etch using CMP to remove the bulk of the plated pole material ((500) in FIG. 9), leaving the wedge shaped tip (10) and possibly some additional material (550); followed by, as shown in FIG. 10B:

(2) the deposition of a sacrificial layer (700) of between approximately 4000 to 5000 angstroms of alumina over exposed upper surface of the remaining pole material, followed by:

(3) a CMP process down to (and substantially through) the CMP stopper layer ((530) in FIG. 10A), to remove (700) and (530) and produce the result schematically shown in FIG. 11.

Referring to FIG. 11, there can now be seen, schematically, the results subsequent to step (3) above, the CMP process that removed the alumina sacrificial layer ((550) in FIG. 10B) and the CMP stopper layer ((50) in FIG. 10B), except for a small portion (53) of the stopper layer that remains on the sidewalls of the trench. After the CMP process, an IBE can be used to adjust the final pole width and to remove any of the excess CMP stopper layer that might remain. At the termination of step (3), the planar upper surface having the pole tip of the present invention (10) and the substrate on which it is formed (5) and an upper pole piece (700). The lower portion of the coil (45) is situated between substrate (5) and a lower shield (90). An isolation gap (65) is formed to prevent flux leakage from the pole to the shield. The side shields cannot be seen in this view. While the particular head structure shown in the figure will achieve the objects provided by the shielded pole, the pole could be incorporated within other head designs as well.

As is understood by a person skilled in the art, the preferred embodiment of the present invention is illustrative of the present invention rather than limiting of the present invention. Revisions and modifications may be made to methods, materials, structures and dimensions employed in forming and providing a PMR head having a three-way, lower side shielded magnetic pole, while still forming and providing such a PMR head and pole and its method of formation in accord with the spirit and scope of the present invention as defined by the appended claims.

What is claimed is:

1. A PMR head having an upper shield and bottom side shielded pole comprising:
   a substrate;
   a pair of laterally disposed and separated bottom side shields formed on said substrate, the shields having coplanar ABS front surfaces and transverse, facing, sloping side surfaces;
   a pair of laterally separated layers of non-magnetic material formed on said lower side shields, the layers having ABS front surfaces coplanar with said side shield ABS front surfaces and transverse, facing, sloping side surfaces coplanar with said sloping side surfaces of said bottom side shields, the separation between said coplanar side surfaces forming a uniform transverse trench having a truncated wedge-shaped cross-sectional shape in the ABS plane and, thereby, forming a similarly shaped opening at said ABS plane, said wedge being widest at the non-magnetic layer surface;
   a magnetic pole formed over said substrate, said pole having a pole tip formed within said transverse trench and being, therefore, of similar cross-sectional shape as said trench and said pole tip being centrally aligned within said trench and terminating at said ABS surface;
   an insulating side gap layer formed about lateral and lower sides of said pole tip, separating said pole tip from said substrate and said side shields;
   a horizontal, planar write gap layer formed over said pole tip and said side shields;
   an upper shield formed over said write gap layer.

2. The PMR head of claim 1 further comprising spirally wound electrically conducting coils formed about said magnetic pole and capable of producing a magnetic field directed substantially perpendicularly to said ABS plane from said pole tip when said coils are electrically energized.

3. The PMR head of claim 1 wherein said bottom side shields are formed of NiFe to a thickness between approximately 500 and 2000 angstroms.

4. The PMR head of claim 1 wherein said layers of non-magnetic material are formed of alumina to a thickness between approximately 1000 and 3500 angstroms.

5. The PMR head of claim 1 wherein said upper shield is formed of NiFe to a thickness between approximately 3000 and 4000 angstroms.

6. The PMR head of claim 1 wherein said magnetic pole is formed of CoFe to a thickness between approximately 5000 and 15000 angstroms.

7. The PMR head of claim 1 wherein said horizontal and side write gap layers are formed of alumina, deposited by a process of atomic layer deposition to a thickness between approximately 300 and 500 angstroms.

8. The PMR head of claim 1 wherein said pole tip has a length between approximately 0.05 and 0.15 microns and a width between approximately 100 and 180 nanometers.

* * * * *